(12) United States Patent
Yang et al.

(10) Patent No.: US 6,721,192 B1
(45) Date of Patent: Apr. 13, 2004

(54) PWM CONTROLLER REGULATING OUTPUT VOLTAGE AND OUTPUT CURRENT IN PRIMARY SIDE

(75) Inventors: Ta-yung Yang, Milpitas, CA (US); Chern-Lin Chen, Taipei Hsien (TW); Jenn-yu G. Lin, Taipei Hsien (TW); Yi-Hsin Leu, Ilan (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 10/249,214

(22) Filed: Mar. 24, 2003

(51) Int. Cl.$^7$ .............................................. H02M 3/335
(52) U.S. Cl. ................. 363/21.18; 363/21.11; 363/97
(58) Field of Search .................. 363/21.01, 21.04, 363/21.05, 21.09, 21.1, 21.11, 21.12, 21.13, 21.17, 21.18, 97, 131

(56) References Cited

U.S. PATENT DOCUMENTS 5,200,886 A * 4/1993 Schwarz et al. ............... 363/49
5,841,643 A * 11/1998 Schenkel ................. 363/21.13
6,118,675 A * 9/2000 Lionetto et al. ......... 363/21.13

* cited by examiner

Primary Examiner—Michael Sherry
Assistant Examiner—Gary L. Laxton
(74) Attorney, Agent, or Firm—Jiang Chyun IP Office

(57) ABSTRACT

A PWM controller according to the present invention provides a technique to control the output voltage and output current of the power supply without the feedback control circuit in the secondary side of the transformer. In order to achieve better regulation, an adaptive load and a feedback synthesizer are equipped into the PWM controller, which associated with the auxiliary winding of the transformer regulate the output voltage of the power supply as a constant. Furthermore, a programmable power limiter in the PWM controller controls the power that is delivered from the primary side to the output of the power supply. The threshold of the power limit is varied in accordance with the change of output voltage. Because the output power is the function of the output voltage of the power supply, a constant current output is realized when the output current of the power supply is greater than a maximum value.

4 Claims, 4 Drawing Sheets

PWM CONTROLLER REGULATING OUTPUT VOLTAGE AND OUTPUT CURRENT IN PRIMARY SIDE

BACKGROUND OF INVENTION

1. Field of the Invention

The present invention relates to a switching power supply and more specifically relates to the pulse width modulation (PWM) controller of the switching power supply.

2. Background of the Invention

With the advantage of high efficiency, smaller size and lighter weight, switching mode power supplies have been widely used in electronic appliances, computers, etc. A typical switching mode power supply generally includes a PWM controller, a power MOSFET, a transformer and a feedback control circuit. The feedback control circuit is used to sense the output voltage and/or the output current in the secondary side of the power supply, and then connect to the PWM controller through an isolated device such as optical-coupler to achieve the feedback loop. FIG. 1 shows a traditional flyback power supply. A capacitor 220 connected to a PWM controller 100 is charged via a resistor 210. The PWM controller 100 is started up once its supply voltage Vcc is higher than the start-threshold voltage. When the PWM controller 100 starts to operate, it will output a PWM signal to drive a MOSFET 300 and a transformer 400, meanwhile its supply voltage $V_{CC}$ will be supplied by the auxiliary winding of the transformer 400 through a rectifier 230. A resistor 240 converts the switching current of the transformer 400 into voltage signal for PWM control and over-power protection. The feedback voltage $V_{FB}$ is derived from the output of an optical-coupler 250. The output voltage conducted through a resistor 290 and a Zener voltage of the Zener diode 280 drive the input of the optical-coupler 250 to form the feedback-loop. Through the PWM controller 100 the voltage $V_{FB}$ determines the on-time ($T_{ON}$) of the PWM signal and decides the output power. A transistor 260 associates with a current-sense resistor 270 and determines the maximum output current. As the output current increases and the voltage across the current-sense resistor 270 exceeds the junction voltage of the transistor 260 such as 0.7 V, the transistor 260 will be turned on to reduce the on-time($T_{ON}$) of the PWM signal through decreasing the feedback voltage $V_{FB}$ and thus clamping the output current of the power supply as a constant.

Although the forgoing circuit is able to regulate output voltage and output current, it is difficult to shrink the power supply without eliminating the optical-coupler and secondary feedback control-circuit. Furthermore the current-sense resistor for the constant current output increases the power consumption of the power supply. According to the present invention, a primary side control eliminates the need of optical-coupler and secondary feedback control-circuit, and therefore reduces the device counts and the size of the power supplies, and so saves cost. Additionally, because the current-sense resistor is not necessary for the constant current output, the efficiency of the power supply is thus improved.

SUMMARY OF INVENTION

The present invention provides a technique to control the output voltage as well as the output current without the need of the feedback circuit in the secondary side of the power supply. The PWM controller indirectly senses the output voltage through its supply voltage, which is supplied by the auxiliary winding of the transformer. A feedback synthesizer is designed to generate a feedback current proportional to the variation of the supply voltage. Since the supply voltage produced by the auxiliary winding is correlated with the output voltage of the power supply, as the output voltage in the secondary side varies due to the variation of the load, this will result in a proportional variation in the auxiliary winding as well. However, the variation of the current flowing through the auxiliary winding creates different voltage drops and greatly affects the accuracy of the detection for the output voltage. In order to improve the regulation, an adaptive load is operated in the form of current, which is varied inversely proportional to the feedback current, which therefore achieves a constant supply current flowing through the path of the auxiliary winding. Consequently, the voltage drops in the auxiliary winding path will not affect the detection of output voltage. Furthermore, a programmable power limiter in the PWM controller controls the power delivered from the primary side of the transformer to the output of the power supply. The threshold of the power limit is varied in accordance with the change of output voltage. Since the output power is the function of the output voltage of the power supply, a constant current output is realized when the output current of the power supply is greater than a maximum value.

Advantageously, the PWM controller can regulate the output voltage and provide a constant current output through the primary side control, which eliminates the need of a feedback control-circuit in the secondary side. Therefore the device counts, the size of the power supply and the cost are greatly reduced. It is to be understood that both the foregoing general descriptions and the following detail descriptions are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
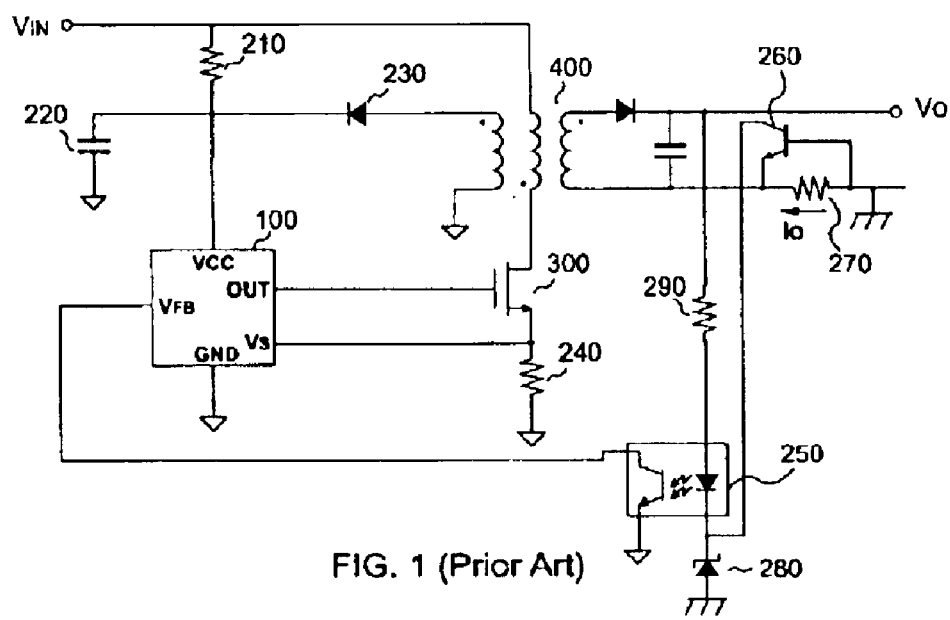
FIG. 1 shows a traditional flyback power supply.
Figure 2:
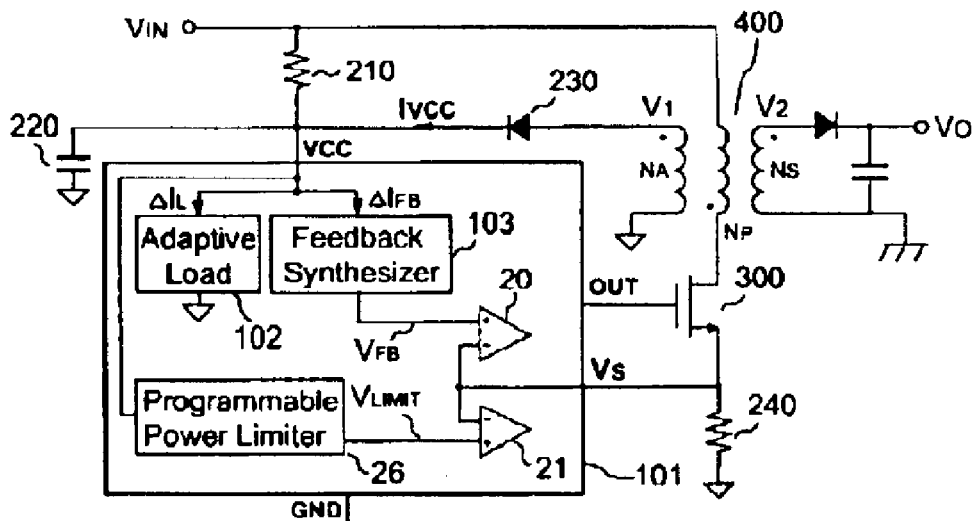
FIG. 2 illustrates a flyback power supply regulating the output power in primary side according to the present invention.

FIG. 2 shows a flyback power supply without the feedback control-circuit in the secondary side of the power supply, in which $V_1$ and $V_2$ are the voltage in the auxiliary winding and the secondary winding of a transformer 400 respectively. The auxiliary winding supplies the supply voltage $V_{CC}$ through a rectifier 230. The voltage $V_2$ is given by, $$V_2 = N_S \frac{d\phi}{dt} \quad (1)$$

where $N_S$ is the turn number of the secondary winding, $\phi$ is the magnetic flux of the transformer, The voltage $V_1$ the auxiliary winding can be expressed as, $$V_1 = N_A \frac{d\phi}{dt} \quad (2)$$

where $N_A$ is the turn number of the auxiliary winding,
From Equation (1) and (2), then $$V_1 = \frac{N_A}{N_S} \times V_2 \quad (3)$$

The voltage $V_1$ induced in the auxiliary winding is correlated with the voltage $V_2$ generated in the secondary winding of the transformer. Since the voltage in the auxiliary side is varied in accordance with the voltage variation in the secondary winding, the output load condition can thus be detected from the auxiliary winding of the transformer in the primary side. According to the present invention, a PWM controller 101 includes a feedback synthesizer 103 to produce a feedback current $I_{FB}$ in accordance with the change of the supply voltage Vcc. The feedback current $I_{FB}$ will generate a feedback voltage $V_{FB}$ to control the on-time of the PWM signal. The feedback current $I_{FB}$ will be reduced and the feedback voltage $V_{FB}$ will be increased in response to the decrease of the supply voltage $V_{CC}$. The increase of the feedback voltage $V_{FB}$ will cause the increase of on-time ($T_{ON}$) of the PWM signal and therefore increase the voltage for the supply voltage $V_{CC}$ and the output of the power supply. On the contrary, when the output load is decreased, the voltages in the secondary winding and the auxiliary winding will increase accordingly. The feedback current $I_{FB}$ will be increased in response to the increase of the supply voltage $V_{CC}$, meanwhile the feedback voltage V is decreased to reduce the on-time ($T_{ON}$) of the PWM signal.

However, when the output load is changed, the variation of the current flowing through the auxiliary winding poses different voltage drops in the rectifier 230 and the auxiliary winding of the transformer 400, and thus greatly affects the accuracy of the detection for the output voltage. An adaptive load 102 included in the PWM controller 101 is applied to compensate the variation of the feedback current $I_{FB}$. The adaptive load current $I_L$ that is produced by the adaptive load 102 is varied in inverse proportion to the feedback current $I_{FB}$ which keeps a supply current $I_{VCC}$ as a constant, which flows through the rectifier 230 and the auxiliary winding of the transformer 400. The constant supply current $I_{VCC}$ keeps the same voltage drops for different load conditions and improves the accuracy of sensing output voltage through the auxiliary winding.

Figure 3:
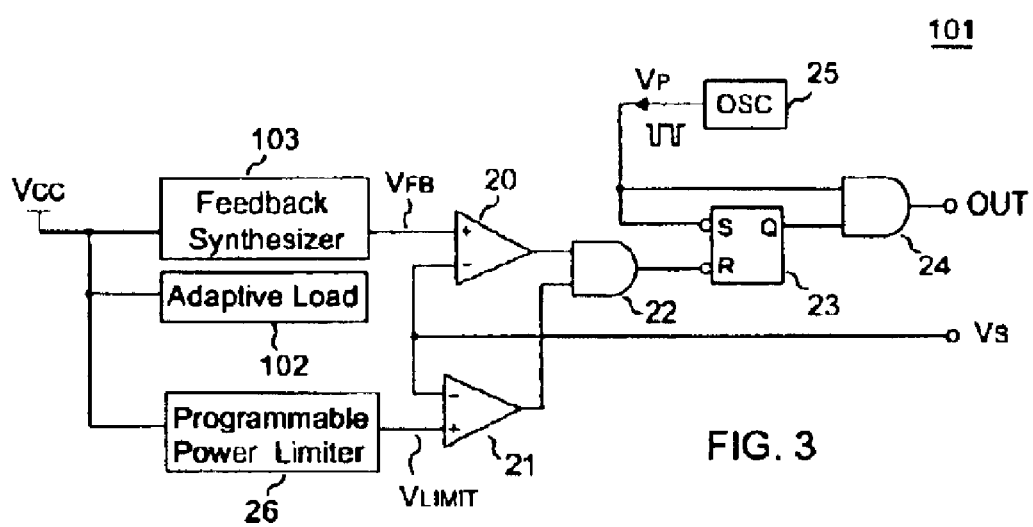
FIG. 3 schematically shows a circuit diagram of the PWM controller according to the present invention.

FIG. 3 schematically shows a circuit diagram of the PWM controller 101 according to the present invention. The PWM controller 101 comprises a first comparator 20, a second comparator 21, an AND-gate 22, an AND-gate 24, a RS flip-flop 23, an oscillator 25, the feedback synthesizer 103, the adaptive load 102 and a programmable power limiter 26. The supply voltage $V_{CC}$ drives the programmable power limiter 26, the feedback synthesizer 103 and the adaptive load 102. The output of the feedback synthesizer 103 is connected to the positive input of the first comparator 20. The negative input of the first comparator 20 and the negative input of the second comparator 21 are connected to a current-sense voltage $V_S$, in which the current-sense voltage Vs is converted from the switching current of the transformer 400 and is coupled to the source of the power MOSFET 300. The positive input of the second comparator 21 is connected to the output of the programmable power limiter 26 for the output power limit. The outputs of the first comparator 20 and the second comparator 21 are connected to two inputs of the AND-gate 22 respectively. The output of the AND-gate 22 is connected to the reset-input of the RS flip-flop 23. The oscillator 25 outputs a pulse signal $V_P$ to the set-input of the RS flip-flop 23. The first Input of the AND-gate 24 is also connected to the pulse signal. The output of the RS flip-flop 23 is connected to the second input of the AND-gate 24. The AND-gate 24 outputs the PWM signal to drive the MOSFET 300.

Figure 4:
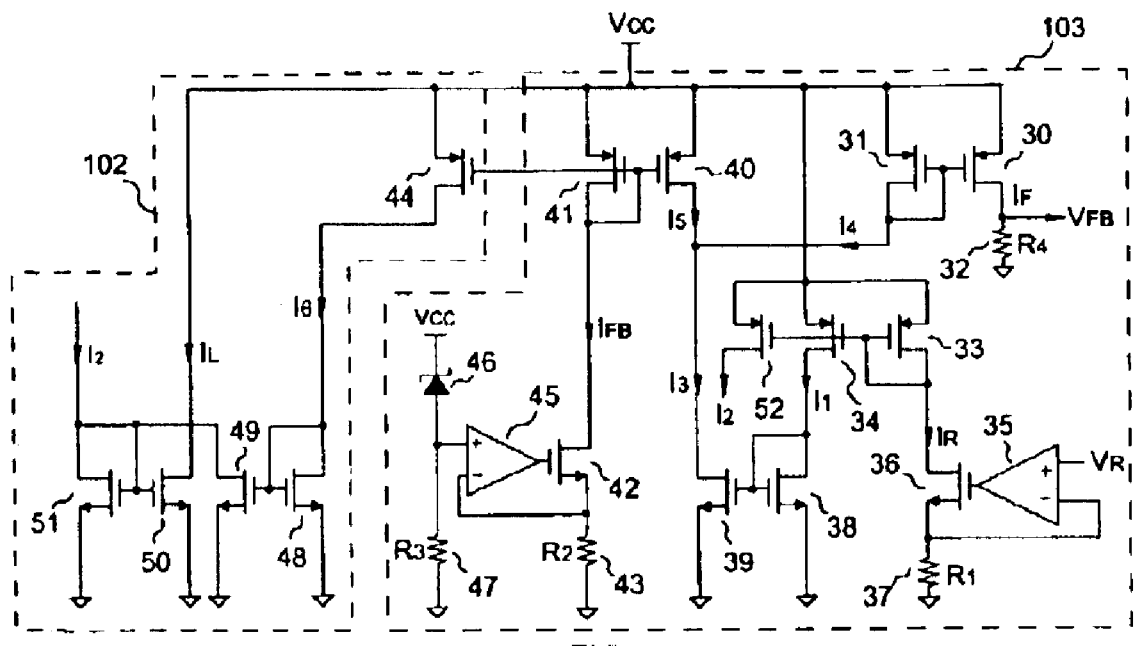
FIG. 4 shows a preferred embodiment of the adaptive load and the feedback synthesizer according to the present invention shown in FIG. 2.

FIG. 4 shows a preferred embodiment of the adaptive load 102 and the feedback synthesizer 103 according to the present invention shown in FIG. 2. The feedback synthesizer 103 comprises a constant current source that is composed of a first operation amplifier (OPA) 35, a first transistor 36 and a first resistor 37; a first current mirror that is composed of a transistor 33 and a transistor 34; a third current mirror that is composed of a transistor 38 and a transistor 39; a fourth current mirror that is composed of a transistor 30 and a transistor 31; a fifth current mirror that is composed of a transistor 41 and a transistor 40; a feedback current source that is composed of a Zenor diode 46, a second resistor 43($R_2$), a third resistor 47($R_3$), a second OPA 45 and a second transistor 42; and a fourth resistor 32($R_4$). A reference voltage $V_R$ is connected to the positive input of the first OPA 35. The output of the first OPA 35 is connected to the gate of the first transistor 36. The source of the first transistor 36 is connected to the negative input of the first OPA 35. The first resistor 37($R_1$) is connected between the source of the first transistor 36 and the ground. The gates of the transistors 33 and 34 and the drains of the transistors 33 and 36 are tied together. The sources of the transistors 33 and 34 are tied together to the supply voltage $V_{CC}$. The gates of the transistors 38 and 39 and the drains of the transistors 34 and 38 are tied together. The sources of the transistors 38 and 39 are connected to the ground. The gates of the transistors 30 and 31 and the drains of the transistors 31, 39 and 40 are tied together. The sources of the transistors 30, 31, 40 and 41 are connected to the supply voltage $V_{CC}$. The gates of the transistors 40 and 41 and the drain of the transistor 41 are tied together to the drain of the second transistor 42. The gate of the second transistor 42 is connected to the output of the second OPA 45. The source of the second transistor 42 is connected to the negative input of the second OPA 45. The second resistor 43($R_2$) is connected between the source of the second transistor 42 and the ground. The third resistor 47($R_3$) is connected between the positive input of the second OPA 45 and the ground. The anode of the Zener diode 46 is connected to the positive input of the second OPA 45. The cathode of the Zener diode 46 is connected to the supply voltage $V_{CC}$. The fourth resistor 32($R_4$) is connected between the drain of the transistor 30 and the ground to convert the drain current of the transistor 30 into a feedback voltage $V_{FB}$.

Through the reference voltage $V_R$ the constant current source outputs a constant current $I_R$, a which is given by $$I_R = V_R / R_1$$

The first current mirror mirrors a first current $I_1$ from the constant current $I_R$. The third current mirror mirrors a third current $I_3$ from the first current $I_1$. Once the output voltage of the power supply varies due to the variation of the output load, a corresponding voltage will result in the auxiliary bias winding and the supply voltage Vcc. The feedback current $I_{FB}$ can be expressed as, $$I_{FB} = \frac{V_{CC} - V_Z}{R_2}, \qquad (4)$$

where Vz is the voltage of the Zener diode 46.

The feedback current $I_{FB}$ is varied in proportion to the variation of the supply voltage $V_{CC}$. As the supply voltage $V_{CC}$ decreases due to the increased load condition, the feedback current $I_{FB}$ will reduce according to Equation (4). The fifth current mirror mirrors a fifth current $I_5$ from the feedback current $I_{FB}$. As FIG. 4 shows, since the third current $I_3$ is kept as a constant, a decreased fifth current $I_5$ will result in an increased fourth current $I_4$. The fourth current mirror mirrors a drain current $I_F$ from the fourth current $I_4$. The fourth resistor 32 ($R_4$) converts the drain current $I_F$ into a feedback voltage $V_{FB}$. Therefore, the on-time($T_{ON}$) of the PWM signal is increased and the output voltage is then raised. On the contrary, while the output voltage of the power supply increases due to a decreased load, the feedback current $I_{FB}$ will be increased and result in a decreased feedback voltage $V_{FB}$ to decrease the on-time of the PWM signal.

As shown in FIG. 2, through the rectifier 230, the auxiliary winding of the transformer 400 provides the supply voltage $V_{CC}$ for the PWM controller 101. The voltage of the auxiliary winding is varied in response to the change of the output load. The different loads will result in different voltages in auxiliary winding of the transformer 400. The variation of the voltage in auxiliary winding causes the modulation and variation of the feedback current $I_{FB}$ and the supply current $I_{VCC}$. The variation of the supply current $I_{VCC}$ creates different voltage drops in the rectifier 230 and the auxiliary winding, which greatly affects the detection of the voltage in auxiliary winding. In order to avoid the different voltage drops in the rectifier 230 and the auxiliary winding, a constant supply current $I_{VCC}$ is needed. Since the feedback current $I_{FB}$ is varied in proportion to the supply voltage $V_{CC}$, the adaptive load 102 is applied to vary the supply current $I_{VCC}$ in inverse proportion to the feedback current $I_{FB}$. Therefore, the supply current $I_{VCC}$ is kept constant. The adaptive load 102 is used to compensate the variation of the feedback current $I_{FB}$, which comprises a second current mirror that is composed of the transistor 33 and a transistor 52; a sixth current mirror that is composed of the transistor 41 and a transistor 44; a seventh current mirror that is composed of a transistor 51 and a transistor 50; and an eighth current mirror that is composed of a transistor 48 and a transistor 49. The gate of the transistor 52 is connected to the gate of the transistor 33. The sources of the transistors 44 and 52 are connected to the supply voltage $V_{CC}$. The drains of the transistors 49, 51 and 52 and the gates of the transistors 50 and 51 are tied together. The gates of the transistors 48 and 49 and the drains of the transistors 44 and 48 are tied together. The sources of the transistors 48, 49, 50 and 51 are connected to the ground. The drain of the transistor 50 is connected to the supply voltage $V_{CC}$. The gate of the transistor 44 is connected to the gate of the transistor 41. The sixth current mirror mirrors a sixth current $I_6$ from the feedback current $I_{FB}$. The second current mirror mirrors a second current $I_2$ from the constant current $I_R$. The adaptive load current $I_L$ is given by $$I_L = N_7(I_2 - N_8 \times I_6) \qquad (5)$$

where $N_7$ and $N_8$ is the ratio of the seventh and eighth current mirror respectively; therefore, Equation (5) can be shown as, $$I_L = N_7(I_2 - N_8 \times N_6 I_{FB}) \qquad (6)$$

where $N_6$ is the ratio of the sixth current mirror.

According to Equation (6), as the feedback current $I_{FB}$ increases, the adaptive load current $I_L$ will reduce. On the contrary, as the feedback current $I_{FB}$ decreases, the adaptive load current $I_L$ will increase. Therefore, the adaptive load current $I_L$ keeps the supply current $I_{VCC}$ as a constant to avoid the different voltage drops in the rectifier 230 and auxiliary winding.

Figure 5:
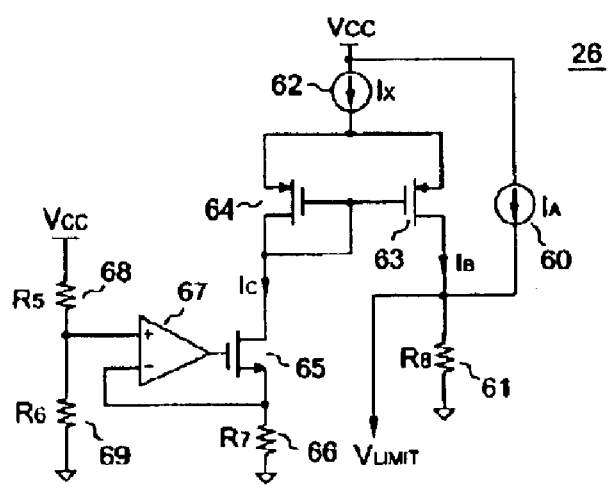
FIG. 5 shows a preferred embodiment of the programmable power limiter.

FIG. 5 shows an embodiment of a programmable power limiter 26 according to the present invention, which comprises a fifth resistor 68 ($R_5$), a sixth resistor 69 ($R_6$) a third OPA 67, a third transistor 65, a seventh resistor 66($R_7$), an eighth resistor 61($R_8$), a current source 60($I_A$), a current source 62($I_X$) and a ninth current mirror that is composed of a transistor 64 and a transistor 63. The fifth resistor 68($R_5$) is connected between the supply voltage $V_{CC}$ and the positive input of the third OPA 67. The sixth resistor 69 ($R_6$) is connected between the positive input of the third OPA 67 and the ground. The output of the third OPA 67 is connected to the gate of the third transistor 65. The negative input of the third OPA 67 is connected to the source of the third transistor 65. The seventh resistor 66 ($R_7$) is connected between the source of the third transistor 65 and the ground. The sources of the transistors 63 and 64 are connected together. The gates of the transistors 63 and 64 and the drains of the transistors 64 and 65 are tied together. The eighth resistor 61 ($R_8$) is connected between the drain of the transistor 63 and the ground. The current source 62($I_X$) is connected between the supply voltage $V_{CC}$ and the source of the transistor 64. The current source 60($I_A$) is connected between the supply voltage $V_{CC}$ and the drain of the transistor 63. The limit voltage $V_{LIMIT}$ is derived from the drain of the transistor 63.

The output power Po is given by, $$P_O = V_O \times I_O$$

where $V_O$ and $I_O$ are the output voltage and output current of the power supply.

Setting $I_O$ as a constant, when, $V_{O2} = 0.5 \times V_{O1}$ we can get, $$P_{O2} = 0.5 \times P_{O1}$$

Due to the power $$P = (1/2) \times L \times I^2 \times f \qquad (7)$$

Set $(1/2) \times L_P \times f = K_0 \qquad (8)$ $$P_O = K_0 \times I_P^2$$

$$I_P = \sqrt{\frac{P_O}{K_0}} = K_1 \sqrt{P_O}$$

Due to $P_{O2} = 0.5 \times P_{O1}$, $$I_{P2} = 0.707 \times I_{P1}$$

Referring to forgoing equations, we find that the output current can be controlled by controlling the primary current of the transformer, in which the constant current output can be acheived by limiting the primary current as ($0.707 \times Ip_1$) when the output voltage is equal to ($0.5 \times Vo_1$) wherein the $Vo_1$ is the maximum output voltage and $Ip_1$ is the maximum output current.

A programmable power limiter is shown in FIG. 5
File: 10244USF.RTF $$I_X = I_B + I_C \quad (9)$$

Set $I_B = I_C$ $$V_{LMIT} = I_B \times R_8 + I_A \times R_8$$

$$I_C = \frac{V_{CC}}{R_7} \times \left(\frac{R_6}{R_5 + R_6}\right) \quad (10)$$

Substitute $I_B$ from equation (9), $$V_{LMIT} = \left(\frac{R_8}{R_7} \times \frac{R_6}{R_5 + R_6} \times V_{CC}\right) + I_A \times R_8$$

Set $K_x = \frac{R_8}{R_7} \times \frac{R_6}{R_5 + R_6}$, $K_y = I_A \times R_8$, From equation (10), $V_{LIMIT} = 1$ and 0.707 for $V_{CC}$ and $V_{CC}/2$ respectively, Then $$V_{CC} \times K_x + K_y = 1 \quad (11)$$

$$\frac{V_{CC}}{2} \times K_x + K_y = 0.707 \quad (12)$$

Figure 6:
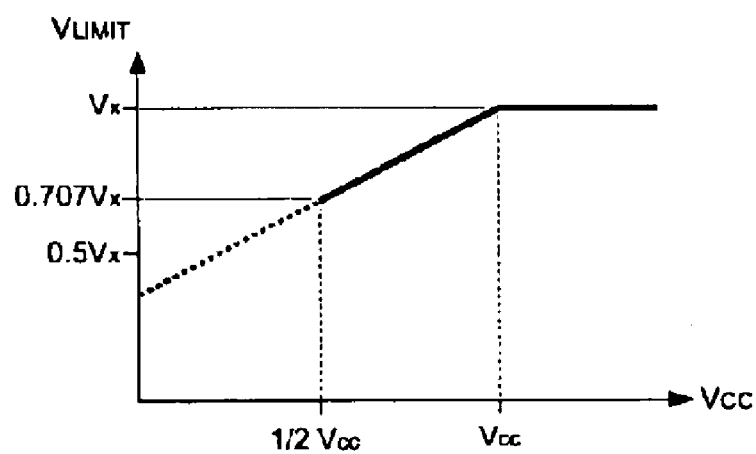
FIG. 6 shows the curve of the limit voltage versus the supply voltage, in which the constant output current is achieved.
Figure 7:
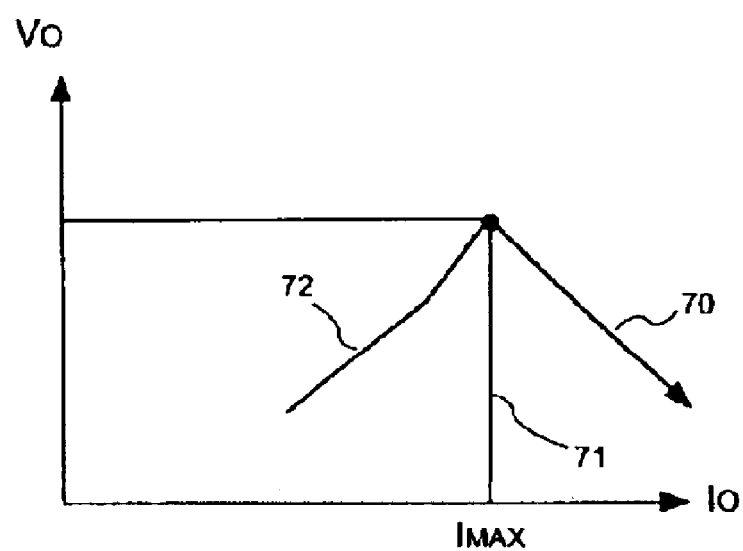
FIG. 7 shows three types of output power limit.

FIG. 6 shows the curve of the limit voltage $V_{LIMIT}$ versus the supply voltage Vcc, in which the constant current output is achieved. The programmable power limiter 26 shown in FIG. 5 generates the limit voltage $V_{LIMIT}$. By properly selecting the $K_x$ and $K_y$ (the resistance of the resistors $R_5$, $R_6$, $R_7$, $R_8$ and the current source $I_A$) according to the equation (11) and (12), the curve shown in FIG. 6 can be determined. The limit voltage is clamped at the voltage $V_X$ such as 1V when the supply voltage exceeds a specific value, wherein the maximum output power is limited. FIG. 7 shows three output power limits including constant power, constant current and current foldback represented by line 70, 71 and 72 respectively, in which different $K_x$ and $K_y$ are applied.

As described above, a feedback synthesizer and an adaptive load are equipped in the PWM controller, which associated with the auxiliary winding of the transformer regulate the output voltage of the power supply as a constant. Furthermore, a programmable power limiter in the PWM controller controls the output power and achieves the constant current output. The PWM controller can regulate the output voltage and provide a constant current output through the primary side control, which eliminates the need of a feedback control circuit in the secondary side. Consequently, the device counts, the size of the power supply and the cost are greatly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A PWM controller for regulating an output voltage and an output current in a primary side circuit, the PWM controller comprising:

a feedback synthesizer for generating a feedback voltage in response to a supply voltage, wherein the supply voltage is supplied by an auxiliary winding of a transformer for powering the PWM controller; wherein the feedback voltage varies in inverse proportion to the supply voltage;

an adaptive load circuit for producing an adaptive load current to keep a supply current as a constant by means of compensation, wherein the supply current is sourced by the supply voltage for powering the PWM controller;

a programmable power limiter for generating a limit voltage, wherein the limit voltage varies in direct proportion to the supply voltage;

an oscillator for outputting a pulse signal;

a first AND-gate having a first input terminal, a second input terminal and an output terminal;

a RS flip-flop for generating an on-off signal, wherein the RS flip-flop is set by the pulse signal and reset by an output of the first AND-gate;

a second AND-gate having a first input terminal, a second input terminal and an output terminal, wherein the first input terminal of the second AND-gate is supplied with the pulse signal, the second input terminal of the second AND-gate is supplied with the on-off signal, and the output terminal of the second AND-gate supplies a PWM signal for switching the transformer;

a first comparator having a positive input terminal, a negative input terminal and an output terminal, wherein the positive input terminal of the first comparator is supplied with the feedback voltage, and the negative input terminal of the first comparator is supplied with a current-sense voltage, wherein the current-sense voltage is converted from a switching current of the transformer; and a second comparator having a positive input terminal, a negative input terminal and an output terminal, wherein the positive input terminal of the second comparator is supplied with the limit voltage and the current-sense voltage is supplied to the negative input terminal of the second comparator, wherein an on-time of the PWM signal increases in direct proportion to the feedback voltage wherein the on-time of the PWM signal decreases in direct proportion to the limit voltage.

2. The PWM controller as claimed in claim 1, wherein the feedback synthesizer comprises:

a first resistor;

a first operational amplifier having a positive input terminal, a negative input terminal and an output terminal, wherein the positive input terminal of the first operational amplifier is supplied with a reference voltage, and the negative input terminal of the first operational amplifier is coupled to the first resistor;

a first transistor having a gate coupled to the output terminal of the first operational amplifier, a source coupled to the first resistor, and a drain for generating a reference current;

a first current mirror for generating a first current, wherein the first current is constant;

a third current mirror for generating a third current, wherein the third current is also constant;

a fourth current mirror for generating a drain-output current;

a fifth current mirror for generating a fifth current;

a Zener diode having an anode and a cathode, wherein the cathode of the Zener diode is supplied with the supply voltage;

a second resistor;

a second operational amplifier having a positive input terminal, a negative input terminal and an output terminal, wherein the positive input terminal of the second operational amplifier is connected to the anode of the Zener diode, and the negative input terminal of the second operational amplifier is coupled to the second resistor;

a third resistor coupled to the positive input terminal of the second operational amplifier; and a second transistor having a gate coupled to the output terminal of the second operational amplifier, a source coupled to the second resistor, and a drain for generating a feedback current, wherein the feedback current varies in direct proportion to the supply voltage; and a fourth resistor for converting the drain-output current into the feedback voltage, wherein the feedback voltage varies in inverse proportion to the feedback current.

3. The PWM controller as claimed in claim 1, wherein the adaptive load circuit comprises:

a second current mirror for generating a second current, wherein the second current is constant;

a sixth current mirror for generating a sixth current;

an eighth current mirror for generating an input-mirror current from the sixth current; and a seventh current mirror for subtracting the input-mirror current from the second current and producing the adaptive load current, wherein the adaptive load current varies in inverse proportion to the feedback current.

4. The PWM controller as claimed in claim 1, wherein the programmable power limiter comprises:

a third operational amplifier having a positive input terminal, a negative input terminal and an output terminal;

a divider composed of a fifth resistor and a sixth resistor, wherein a first terminal of the fifth resistor is supplied with the supply voltage, wherein a second terminal of the sixth resistor is connected to a ground reference, wherein a second terminal of the fifth resistor and a first terminal of the sixth resistor are connected to the positive input terminal of the third operational amplifier;

a seventh resistor;

a third transistor having a gate coupled to the output terminal of the third operational amplifier, a source coupled to the seventh resistor, and a drain for generating a left-mirror current; wherein the left-mirror current varies in direct proportion to the supply voltage;

a ninth current mirror having a left-transistor and a right-transistor for generating a right-mirror current from the left-mirror current; wherein a source of the left-transistor and a source of the right-transistor are connected together; wherein a drain of the left-transistor is connected to a gate of the left-transistor and a gate of the right-transistor, wherein the right-mirror current is generated via a drain of the right-transistor;

a first current source, wherein an input terminal of the first current source is supplied with the supply voltage, wherein an output terminal of the first current source is connected to the source of the left-transistor;

a second current source, wherein an input terminal of the second current source is supply with the supply voltage, wherein an output terminal of the second current source is connected to the drain of the right-transistor; and an eighth resistor for converting a sum-current into the limit voltage, wherein the sum-current is obtained from summing an output current of the second current source and the right-mirror current.

* * * * *